United States Patent [19]

Ohta et al.

[11] Patent Number: 5,037,289
[45] Date of Patent: Aug. 6, 1991

[54] BLOW MOLDING MOLD FOR FORMING HOLLOW DOUBLE-WALLED PRODUCT AND BLOW MOLDING APPARATUS USING SUCH MOLD

[75] Inventors: Akira Ohta; Masanori Kikuchi, both of Saitama, Japan

[73] Assignee: Kabushiki Kaisha Placo, Saitama, Japan

[21] Appl. No.: 438,602

[22] Filed: Nov. 17, 1989

[30] Foreign Application Priority Data

Nov. 30, 1988 [JP] Japan ................................. 63-303446
Dec. 2, 1988 [JP] Japan ................................. 63-303894

[51] Int. Cl.$^5$ ............................................. B29C 49/04
[52] U.S. Cl. .................................... 425/532; 264/514; 425/442; 425/450.1
[58] Field of Search .................. 249/170, 171, 172; 425/522, 532, 533, 442, 450.1; 264/511, 513, 514

[56] References Cited

U.S. PATENT DOCUMENTS 4,761,130 8/1988 Peters ......................... 425/450.1

FOREIGN PATENT DOCUMENTS 46-14153 4/1971 Japan .
49-18748 2/1974 Japan .
49-41111 4/1974 Japan .
51-13495 2/1976 Japan .
60-67130 4/1985 Japan .
60-71223 4/1985 Japan .................................. 425/522
63-221020 9/1988 Japan .

Primary Examiner—Timothy Heitbrink
Attorney, Agent, or Firm—Flynn, Thiel, Boutell & Tanis

[57] ABSTRACT

A blow molding mold for making a hollow double-walled product includes male and female mold members movable toward and away from each other. The female mold member has a bottom and has first and second pairs of confronting peripheral wall segments, the wall segments of the second pair being pivotal relative to the bottom between open and closed positions. In one embodiment, the peripheral wall segments of the first pair are fixedly coupled to the bottom. In a different embodiment, the wall segments of the first pair are also pivotal between open and closed positions, and have expansion prevention walls which project outwardly from opposite sides thereof and which, when the wall segments of the first and second pairs are in their closed positions, project outwardly beyond the peripheral wall segments of the second pair.

13 Claims, 11 Drawing Sheets

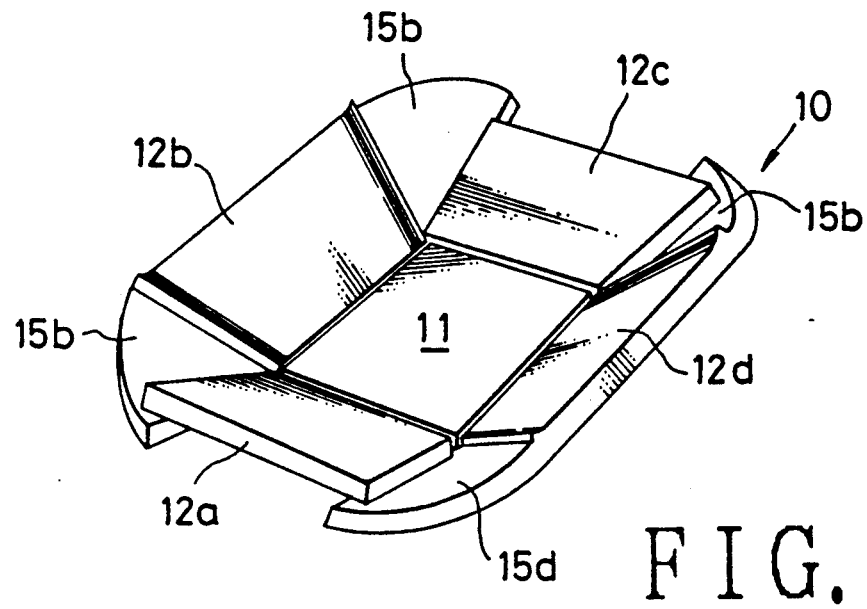
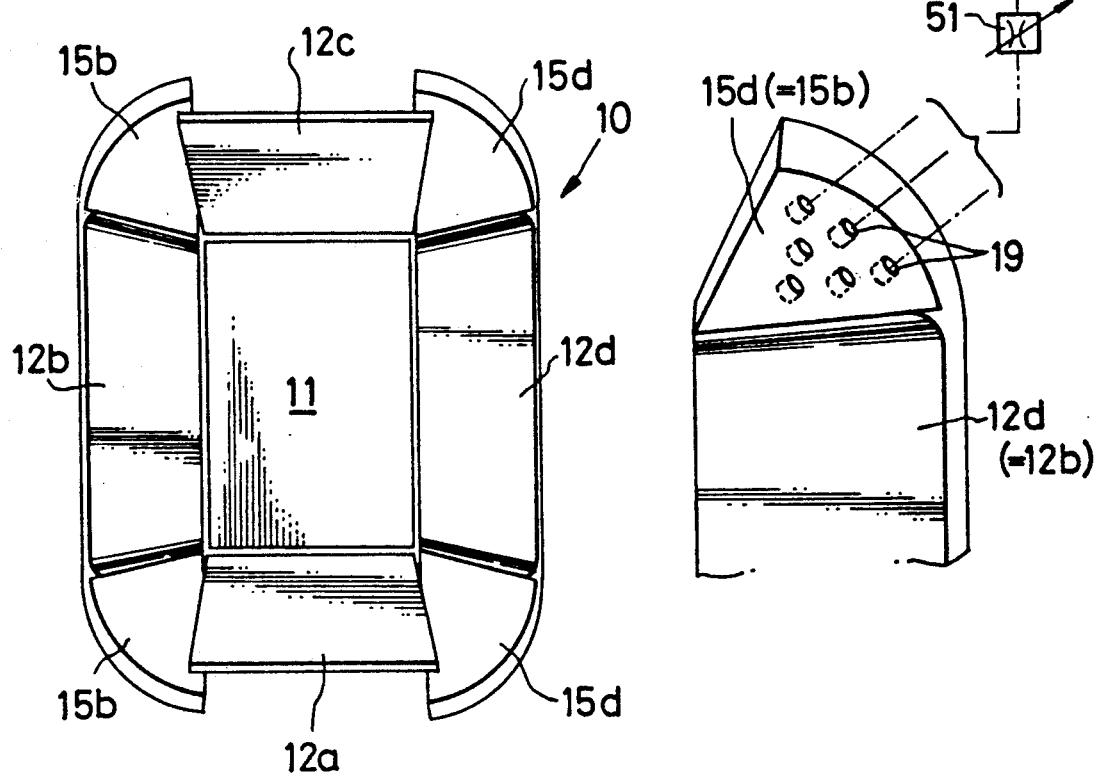

BLOW MOLDING MOLD FOR FORMING HOLLOW DOUBLE-WALLED PRODUCT AND BLOW MOLDING APPARATUS USING SUCH MOLD

BACKGROUND OF THE INVENTION

The present invention relates to a mold for molding a hollow double-walled product by supplying a cylindrical parison of synthetic resin extruded by the die of an extruder to a position between a pair of male and female mold members, moving the mold members toward each other to pinch and seal the parison therebetween, and injecting air into the parison, and a blow molding apparatus which employs such a mold.

Various processes for manufacturing hollow double-walled products have been developed so far. Examples of such processes are disclosed in Japanese Patent Publications No. 46(1971)-14153, 49(1974)-18748, and 51(1976)-13495.

However, there are known only few molds used to mold hollow double-walled products. There molds are shown in Japanese Patent Publication No. 49(1974)-41111, Japanese Laid-Open Patent Publication Nos. 60(1986)-67130, and 63(1988)-221020.

According to Japanese Laid-Open Patent Publication No. 60(1986)-67130, a mold includes a female mold member having four separate peripheral wall segments and a bottom. When air is injected into the parison, the parison can be smoothly moved along the inner wall surfaces of the peripheral wall segments, so that a double-wall product having a uniform thickness can be molded. Double-walled products thus molded are stronger than those produced by conventional molds. All of the four peripheral wall segments are swingable outwardly, and they are required to swing in timed relation to the injection of air into the parison. The mold and a molding apparatus using the mold are therefore complex and expensive. Another problem is that a product molded by the mold has burrs on all four corners thereof. Though the molded product has a sufficient degree of mechanical strength, the burrs have to be removed in a subsequent step, and the product needs to be improved for its commercial value.

The mold disclosed in Japanese patent Publication No. 49(1974)-4111 is only limited to the fabrication of a product having a body and a lid which share a hinge. This mold is therefore less versatile. The hinge of the molded product tends to be thin.

The mold shown in Japanese Laid-Open Patent Publication No. 63(1988)-221020 also lacks versatility because it is used exclusively to form undercuts on molded parts.

SUMMARY OF THE INVENTION

It is an object of the present invention to provide a blow molding mold of a relatively simple structure which can manufacture a double-walled product that has an increased depth and a uniform thickness, and a molding apparatus employing such a mold.

Another object of the Present invention is to provide a blow molding mold including peripheral wall segments which will form therebetween no or little burrs on a molded product when the peripheral wall segments are erected so that the corners of the molded product can easily be treated subsequently and neatly be finished for increased commercial value, and molded products can be manufactured with a better yield.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a perspective view of a female mold member according to another embodiment of the present invention;

FIG. 8 is a plan view of the female mold member shown in FIG. 7;

FIG. 9 is a fragmentary plan view of a female mold member according to still another embodiment of the present invention;

DETAILED DESCRIPTION OF THE PREFERRED EMBODIMENTS

Figure 1:
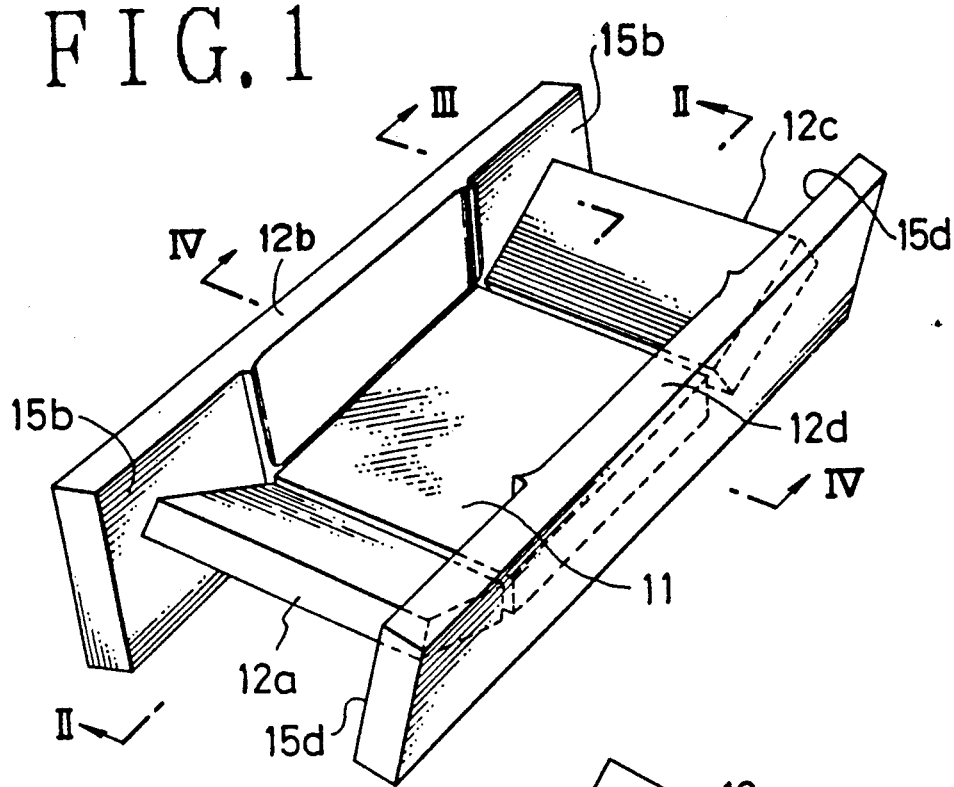
FIG. 1 is a perspective view of a female mold member of a mold according to an embodiment of the present invention.
Figure 2:
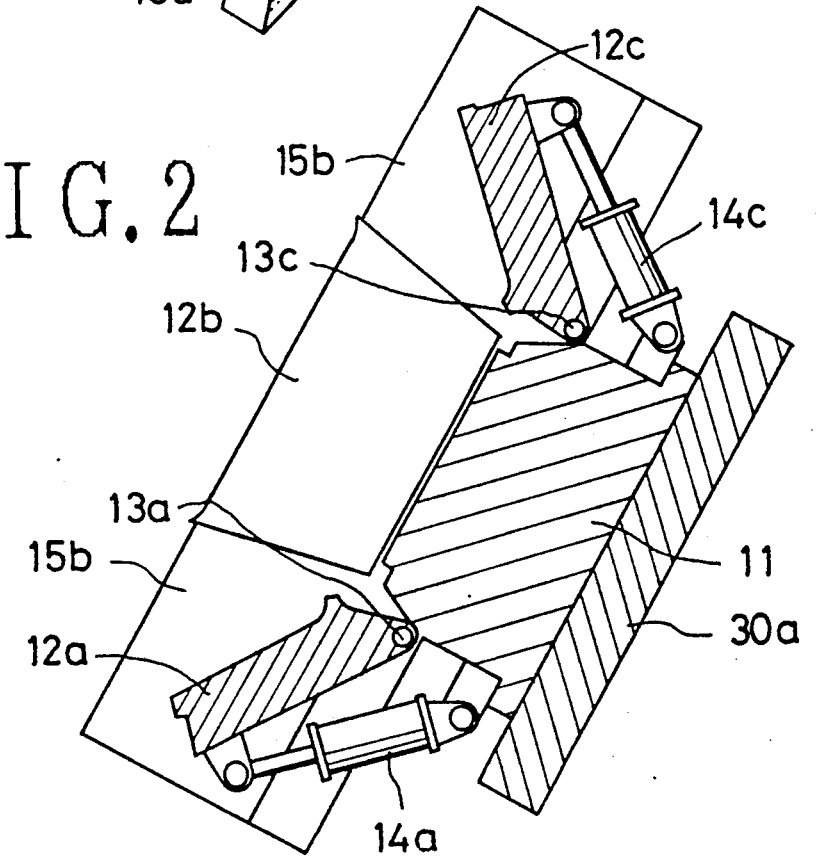
FIG. 2 is a cross-sectional view taken along line II—II of FIG. 1.

Like or corresponding parts are denoted by like or corresponding reference characters throughout views.

Figure 3:
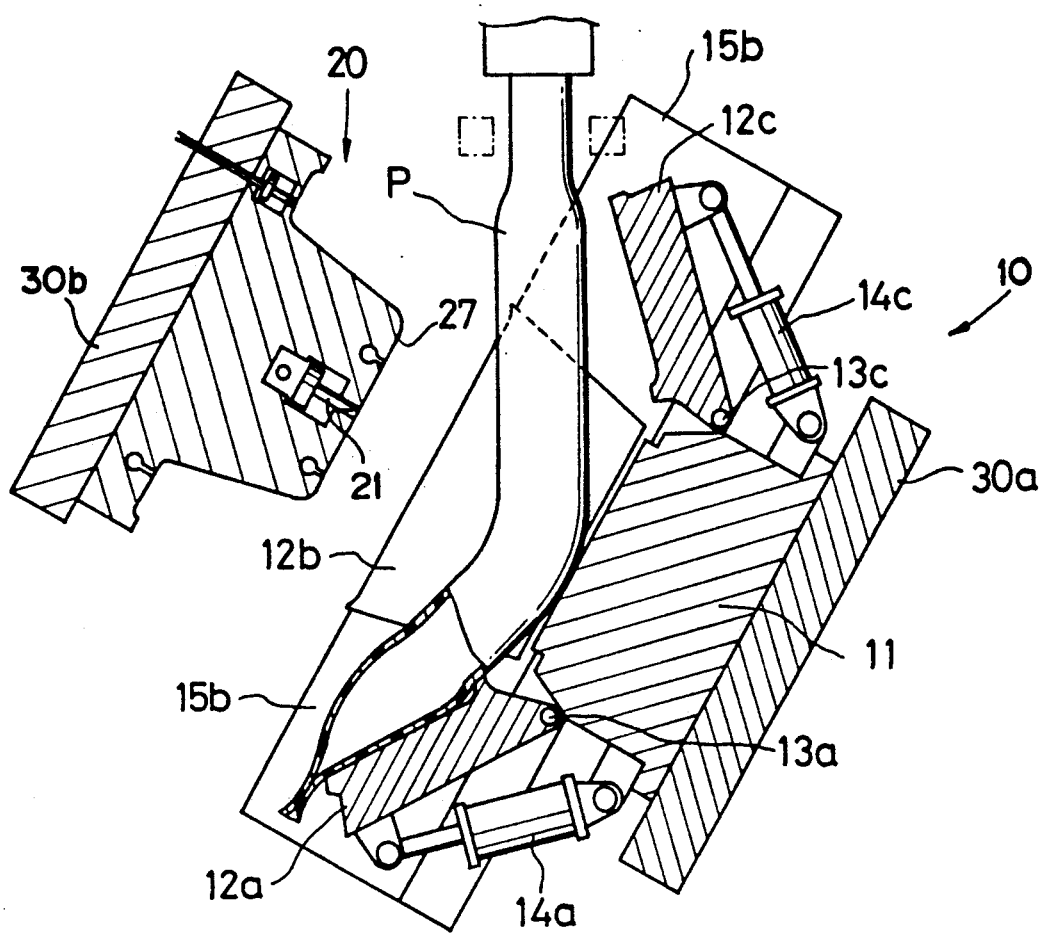
FIG. 3 is a cross-sectional view of a blow molding apparatus which employs the mold with peripheral wall segments being inclined outwardly during a blow molding process.
Figure 4:
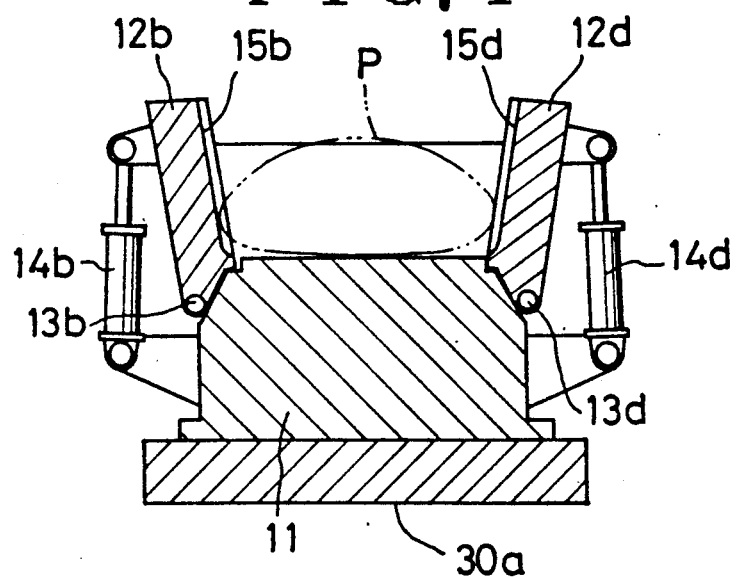
FIG. 4 is a cross-sectional view taken along line IV—IV cf FIG. 1.
Figure 5:
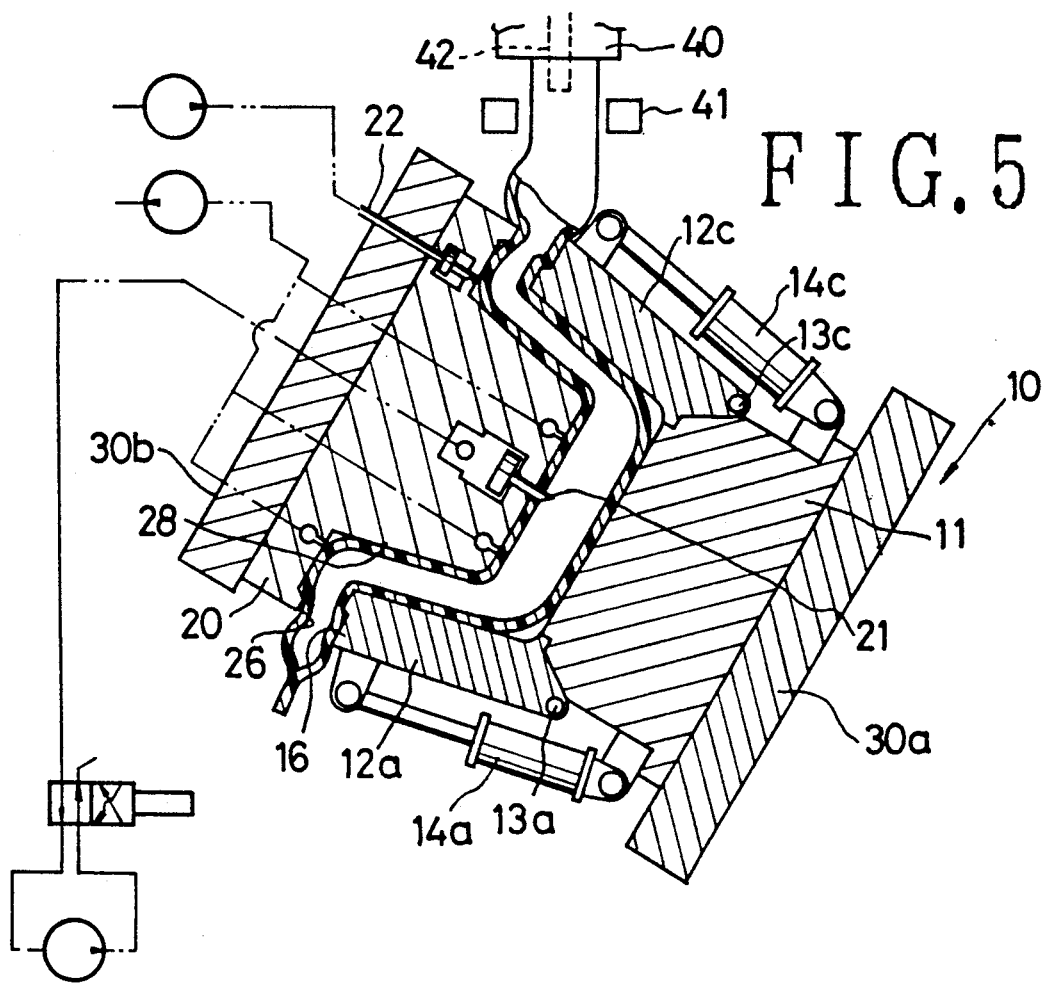
FIG. 5 is a cross-sectional view of the blow molding apparatus with the peripheral wall segments being erected during the blow molding process.

FIGS. 1 through 6 show a blow melding apparatus employing a mold according to an embodiment of the present invention. As shown in FIGS. 3 and 5, the mold comprises a female mold member 10 and a male mold member 20 which are fixedly mounted on a pair of support plates 30a, 30b, respectively, of a mold clamping device of the blow molding apparatus.

Figure 6:
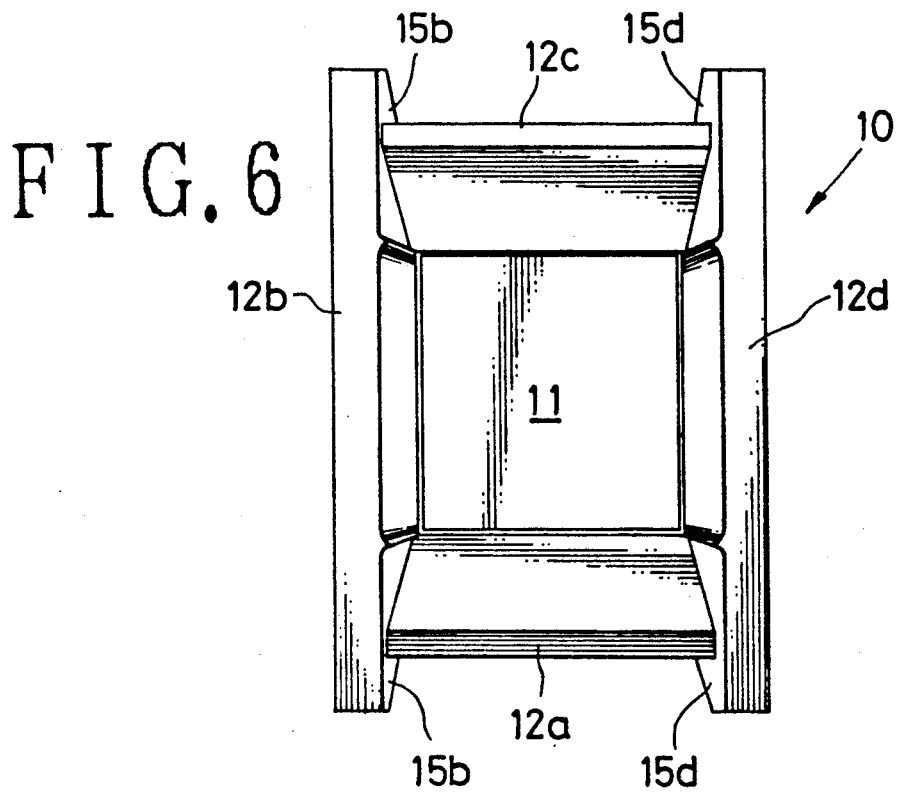
FIG. 6 is a plan view of the female mold member shown in FIG. 1.

As shown in FIGS. 1 and 6, the female mold member 10 comprises a bottom 11 and four peripheral Wall segments 12a, 12b, 12c, 12d, confronting two of these peripheral wall segments being operable as a pair. The peripheral wall segments 12a, 12b, 12c, 12d are swingable or angularly movable outwardly from a closed position in which they form a box as shown in FIGS. 4, 5, and 6, about pivot shafts 13a, 13b, 13c, 13d, respectively. The pivot shafts 13a, 13b, 13c, 13d are positioned outwardly of and extend parallel to the respective side edges cf the bottom 11, and join the peripheral wall segments 12a, 12b, 12c, 12d angularly movably to the bottom 11. The peripheral wall segments 12a, 12b, 12c, 12d can be angularly moved by respective fluid-pressure or hydraulic actuator in the form of cylinder units 14a, 14b, 14c, 14d connected between the peripheral wall segments 12a, 12b, 12c, 12d and the bottom 11.

The paired peripheral wall segments 12b, 12d have pairs of parison corner expansion prevention walls 15b, 16d, respectively, disposed on their opposite sides and extending parallel to the direction in which a parison (described later on) will be supplied. The corner expansion prevention walls 15b, 15d in each pair project away from each other. In this embodiment, the peripheral wall segments 12b, 12d and the corner expansion prevention walls 18b, 15d lie substantially flush with each other as having substantially two-dimensional (flat) surfaces.

The male mold member 20 shown in FIGS. 3 and 5 is of a known structure comprising a single block or a plurality of blocks. If the male mold member 20 is composed of a plurality of blocks, some of the blocks may move back and forth when the mold members 10, 20 are clamped.

The male mold member 20 has a needle-shaped air supply/discharge nozzle 21 for being inserted into a parison, and a blow injection needle 22. However, only the air supply/discharge nozzle 21 may be provided, and the blow injection needle 22 may be dispensed with.

A pair of parison pinching members 41 (FIG. 5) serves to flatten and fuse a portion of an extrusion-molded or injection-molded melted parison P transversely.

The blow molding apparatus shown in FIGS. 1 through 6 operates as follows; The mold members 10, 20 are first fixedly mounted on the support plates 30a, 30b, respectively, in confronting relation to each other. At this time, the peripheral wall segments 12b, 12d with the corner expansion prevention walls 15b, 15d joined thereto are oriented parallel to the direction in which the parison P is supplied into the blow molding apparatus. More specifically, when the mold members 10, 20 are installed on the support plates 30a, 30b with mating faces 16, 26 (FIG. 5) of the mold members 10, 20 being directed vertically or obliquely (at an angle smaller than 50 to the vertical plane), the peripheral wall segments 12b, 12d are horizontally spaced from each other and the peripheral wall segments 12a, 12c are vertically spaced from each other.

When a melted tubular parison P is to be supplied from a blow head 40 of an extrusion or injection molding machine, the support plates 80a, 80b are displaced from each other to space the mold members 10, 20 away from each other, and the peripheral wall segments 12a, 12b, 12c, 12d of the female mold member 10 are opened, i.e., angularly displaced outwardly in horizontal and vertical directions by the respective hydraulic actuators 14a, 14b, 14c, 14d. At this time, the opposite side edges of the vertically spaced peripheral wall segments 12a, 12c are positioned very closely to the walls 15b, 15d joined to the horizontally spaced peripheral wall segments 12b, 12d. In other words, the wall segments 12b, 12d are erected to some extent.

Then, the parison P is extruded from the blow head 40 into a position between the mold members 10, 20.

The leading end of the parison P is temporarily pinched by the parison pinching members 41 so that the leading end of the parison P is sealed off. Then the parison pinching members 41 are moved away from each other to release the parison P. Air is supplied from a second air supply/discharge nozzle 42 (FIG. 5) opening into the parison P so that the inner wall surfaces of the parison P will not adhere to each other. The parison P as it is extruded is moved along the inner surfaces of the peripheral wall segments 12b, 12d and positioned therebetween. After the parison P has completely been placed between the peripheral wall segments 12b, 12d, the trailing end of the parison P is sealed off by the parison pinching members 41.

Thereafter, one or both of the support plates 30a, 30b are moved to displace the mold members 10, 20 toward each other until the parison P is lightly sandwiched between a projecting face 27 of the mold member 20 and an inner surface of the bottom 11 of the mold member 10 and the parison P is pierced by the air supply/discharge nozzle 21 on the mold member 20. The mold members 10, 20 are further moved toward each other to flatten the parison P. When the parison P is flattened to a desired size, the mold members 10, 20 are stopped temporarily.

While regulating the air pressure in the parison P, the hydraulic actuators 14a, 14b, 14c, 14d are simultaneously operated to erect the peripheral wall segments 12a, 12b, 12c, 12d slowly. During this time, the layer of the parison P which faces the female mold member 10 is brought into contact with the inner surfaces of the bottom 11 and the peripheral wall segments 12a, 12b, 12c, 12d. The parison P may also contact with the corner expansion prevention walls 15b, 15d.

As the peripheral wall segments 12a, 12b, 12c, 12d are progressively erected with respect to the bottom 11, the layer of the parison P which faces the male mold member 20 is also brought into wilder contact with a main wall surface 28 of the mold member 20. The peripheral wall segments 12a, 12b, 12c, 12d are finally pressed against each other along their adjacent edges, and also against the adjoining side edges of the bottom 11.

Portions of the parison P which are positioned along the adjacent edges of the peripheral wall segments 12a, 12b, 12c, 12d are borne by the corner expansion prevention walls 15b, 16d fully or substantially fully against outward expansion. These portions of the parison P may be wrinkled along the edges of the peripheral wall segments 12a, 12b, 12c, 12d, projecting into the parison P or increasing the wall thickness of the parison P. Since the parison P is not pinched between the adjacent peripheral wall segments 12a, 12b, 12c, 12d, no burr is formed on the parison P by these peripheral wall segments.

Then, the support plates 30a, 30b age further moved toward each other to press the mating surfaces 16, 26 against each other. Any excessive parison layer then forms burrs between these mating surfaces 16, 26.

Remaining air between the parison P and the mold members 10, 20 is removed, and air under pressure is injected from the air supply/discharge nozzle 21 or the blow in needle 22 to inflate the parison P along the inner surfaces of the mold members 10, 20. Thereafter, the mold members 10, 20 with the parison P therebetween are cooled, the mold members 10, 20 are separated away from each other, and the peripheral wall segments 12a, 12b, 12c, 12d are opened or angularly moved outwardly by the respective hydraulic actuators 14a, 14b, 14c, 14d, after which the molded product is removed from the mold members 10, 20.

The molded product of a double-walled construction has burrs on its edge around the open end thereof. Therefore, such burrs are removed. If any burrs are present on the corner edges between side panels of the product and the edges between the bottom panel and side panels thereof, such burrs are also removed. After the molded product has been deburred, it is presented as a finished product.

In another blow molding process, the parison P may be supplied between the mold members 10, 20 in a direction across the peripheral segments 12b, 12d, i.e., the corner expansion prevention walls 15b, 16d joined thereto, and the support plates 30a, 30b may be vertically movable toward and away from each other. In this blow molding process, the support plate 30a lied horizontally as shown in FIG. 4. Mere specifically, the parison P is horizontally supplied toward the mold members 10, 20, and then over one of the peripheral wall segments 12b, 12d which are open and along the inner surfaces of the bottom 11 and the peripheral wall segments 12b, 12d. Thereafter, the blow molding process is carried out as described above.

FIGS. 7 and 8 show a female mold member according le another embodiment of the present invention. The female mold member 10 shown in FIGS. 7 and 8 differs from the female mold member 10 shown in FIG. 2 in that corner expansion prevention walls 15b, 15d have partly conical or inwardly concave inner surfaces, the inner edges of which lie substantially with the inner surfaces of the peripheral wall segments 12b, 12d. In a blow molding process, the peripheral wall segments 12b, 12d are tilted more outwardly than those illustrated in FIG. 1.

FIG. 9 fragmentarily shows a female mold member in accordance with still another embodiment of the present invention. The female mold member shown in FIG. 9 is substantially the same as the female mold member shown in FIGS. 7 and 8 except that each of corner expansion prevention walls 15b, 15d has a number of air outlet holes 19 defined therethrough and extending between its inner and outer surfaces. The air outlet holes 19 are connected to a pressurized air source 50 through a control valve 61. While the peripheral wall segments 12a, 12b, 12c, 12d are being tilted inwardly from an outwardly open position until adjacent ones of the peripheral wall segments 12a, 12b, 12c, 12d are pressed against each other, warm air supplied from the pressurized air source 50 is injected through the air outlet holes 19 into the female mold member. When the air is thus supplied, the layers, near the walls 15b, 15d, of the parison placed in the female mold member are kept out of contact with the walls 15b, 15d by the dynamic pressure and layer of the supplied air, and hence will not form burrs thereon.

With the foregoing embodiments, since the peripheral wall segments of the female mold member are pivotally tiltable outwardly with respect to the bottom, the parison can be supplied between the male and female mold members with the peripheral wall segments opened outwardly. In operation, the parison as it is supplied is first brought into contact with the bottom and then held by the female mold member so as to face the male mold member. When the peripheral wall segments are lifted with respect to the bottom, they are brought into contact with the parison through a greater area of contact. Even when the peripheral wall segments are opened outwardly, gaps or spaces therebetween are closed by the corner expansion prevention surfaces. The air outlet holes 19 are connected to a pressurized air source 50 through a control valve 51. While the peripheral wall segments 12a, 12b, 12c, 12d are being tilted inwardly from an outwardly open position until adjacent ones of the peripheral wall segments 12a, 12b, 12c, 12d are pressed against each other, warm air supplied from the air outlet holes 19 into the female mold member. When the air is thus supplied, the layers, near the walls 15b, 15d of the parison placed in the female mold member are kept out of contact with the walls 15b, 15d by the dynamic pressure and layer of the supplied air, and hence will not form butts thereon.

With the foregoing embodiments, since the peripheral wall segments of the female mold member are pivotally tiltable outwardly with respect to the bottom, the parison can be supplied between the male and female mold members with the peripheral wall segments opened outwardly. In operation, the parison as it is supplied is first brought into contact with the bottom and then held by the female mold member so as to face the male mold member. When the peripheral wall segments are lifted with respect to the bottom, they are brought into contact with the parison through a greater area of contact. Even when the peripheral wall segments are opened outwardly, gaps or spaces therebetween are closed by the corner expansion prevention walls which thus prevent the parison from being expanded between these corner expansion prevention walls. When the peripheral wall segments are fully erected with respect to the bottom, the corner expansion prevention walls hold the corresponding parison layers, reducing burrs on the parison. Alternatively, by regulating the air pressure in the parison, any burrs are prevented from being formed on the molded product at its corners and edges except the open end thereof.

The edges between the peripheral walls or panels of the molded product are rendered strong since they arc thick or wrinkled inwardly. The edges and corners of the molded product are not reduced in thickness but the molded product has a substantially uniform wall thickness. Inasmuch as few burrs are formed on the product, the process of deburring the product is simplified and the material can be utilized efficiently.

The female mold member shown in FIGS. 1 through 6 can easily be manufactured since the corner expansion prevention walls are simple in configuration.

The female mold member shown in FIGS. 7 and 9 is advantageous in that the peripheral wall segments with the corner expansion prevention walls joined thereto can also be opened largely in the outward direction, and when the peripheral wall segments are opened, they are interconnected by the corner expansion prevention walls to prevent the parson from being overly expanded at the corners. Moreover, the peripheral wall segments are tiltable through a larger angle to form a molded product of a deeper double-walled construction. The peripheral wall segments may have substantially uniform surfaces, and may be attached to the support plate in an angular position which is 90° different from that shown tn FIGS. 2 and 3.

With the embodiment shown in FIG. 9, the corners of the parison are supported by the dynamic pressure or layer of air supplied from the air outlet holes, making the parison free of burrs. As the air outlet holes are connected to the pressurized air source through the control valve, the pressure of air to be supplied from the air outlet holes can be adjusted to a suitable level depending on the thickness, material, and shape of a parison to be introduced into the blow molding apparatus.

Figure 10:
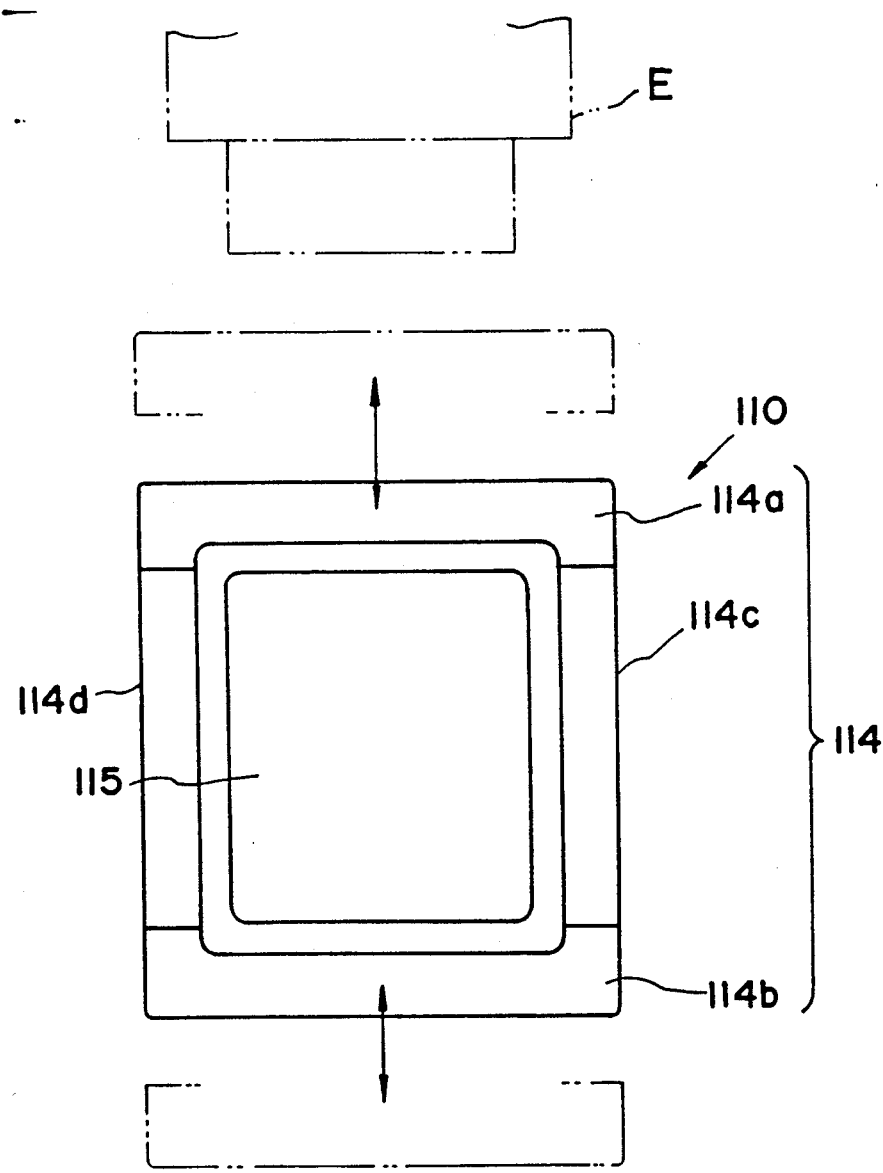
FIG. 10 is a plan view of a female mold member according to yet another embodiment of the present invention.

FIG. 10 shows a female mold member according to yet another embodiment of the present invention. The female mold member 110 comprises four peripheral wall segments 114 and a bottom 115, and has a box-shaped recess defined thereby.

The peripheral wall segments 114 include upper and lower movable wall segments 114a, 114b and laterally spaced fixed side wall segments 114c, 114d. The upper and lower wall segments 114a, 114b have proximal portions 116 (FIG. 11) pivotally supported on the bottom 115 by first pivot shafts 117 located outwardly of edges of the bottom 115. The upper and lower wall segments 114a, 114b are angularly movable between an open position in which they are angularly displaced outwardly and a closed position in which they are erected in the vicinity of the other fixed side wall segments 114c, 114d, thereby forming a female mold. The side wall segments 114c, 114d are fixed perpendicularly to the bottom 115.

Figure 11:
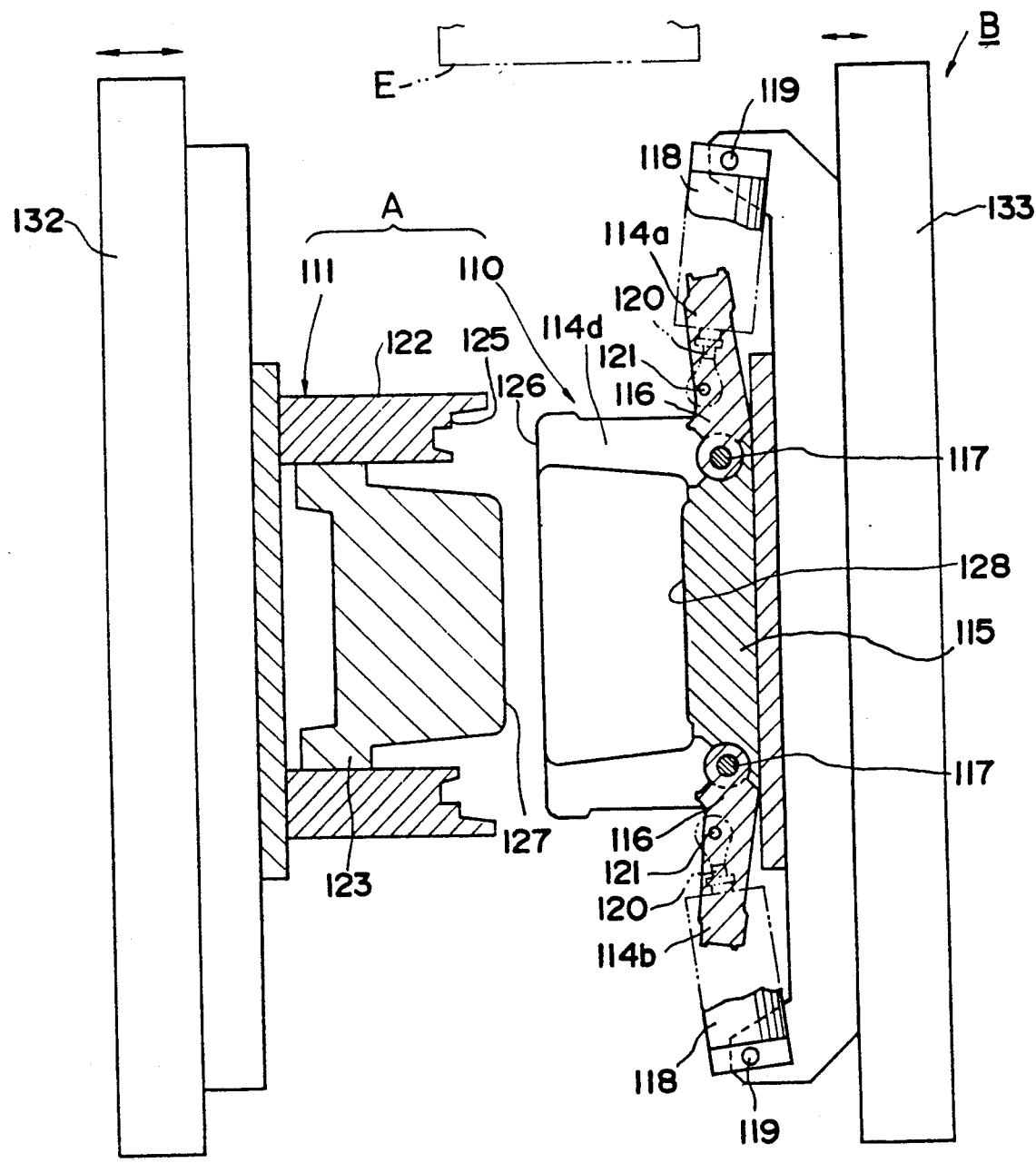
FIG. 11 is a cross-sectional view of a blow molding apparatus which employs the female mold member shown in FIG. 10.
Figure 12:
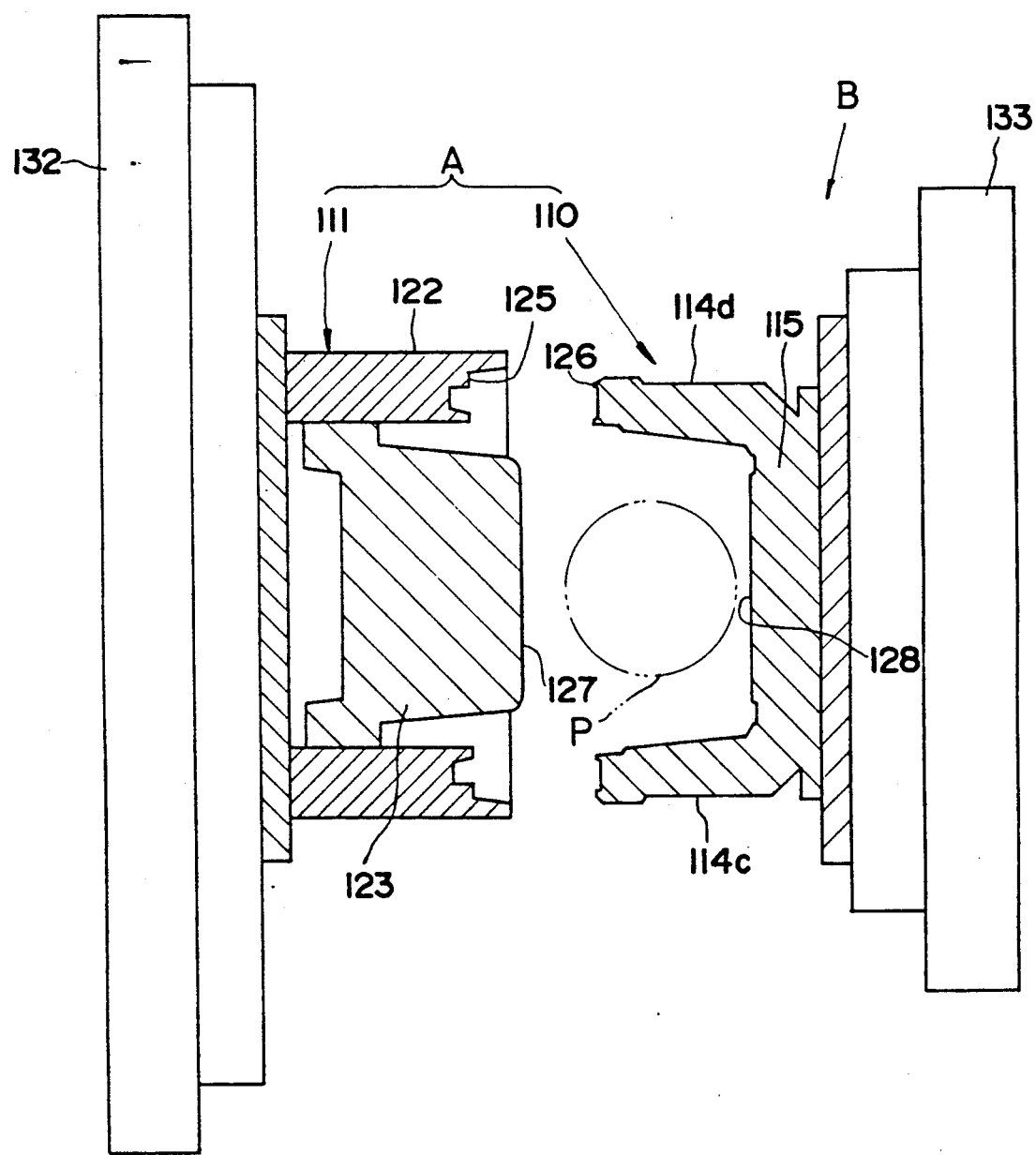
FIG. 12 is a transverse cross-sectional view of the blow molding apparatus shown in FIG. 11.

As shown in FIG. 11, a blow molding apparatus which incorporates the female mold member shown in FIG. 10 includes a male mold member 111. The female and male mold members 110, 111 jointly constitute a blow molding mold A. The blow molding apparatus B also includes a pair of support plates 132, 133 on which the male and female mold members 111, 110 are mounted. The support plates 132, 133 are horizontally movable toward and away from each other by a mold clamping device (not shown).

Fluid-pressure or Hydraulic actuators comprise hydraulic cylinders 118 having ends pivotally supported on the support plate 133 by second pivot shafts 119 which are located outwardly of the pivot shafts 117 and extend parallel thereto. The hydraulic cylinders 118 have piston rods 120 pivotally connected at distal ends thereof to intermediate portions of the upper and lower wall segments 114a, 114b by third pivot shafts 121 extending parallel to the first and second pivot shafts 117, 119. The hydraulic actuators operate to angularly move the upper and lower wall segments 114a, 114b between an open position in which they lie substantially parallel to the bottom 115, i.e., the support plate 133, and a closed position in which they are erected substantially perpendicularly to the bottom 115, i.e., the support plate 133, thereby forming a female mold.

The ends of the hydraulic cylinders 118 may be connected to the bottom 115, by the pivot shafts 119.

The male mold member 111 is of a shape complementary to the female mold member 110, and comprises a hollow prismatic peripheral wall 122 which is rectangular in shape when viewed in plan, and an inner surface forming block 123 movably disposed in the hollow peripheral wall 122 and movable toward and away from the bottom 115 of the female mold member 110. The peripheral wall 122 has an upper surface 126 engageable with the lip ends 126 of the peripheral wall segments 114 of the female mold member 110. When the upper surface 126 engages the tip ends 126 of the peripheral wall segments 111, they sever a parison P and confine the severed parison P between the mold member 110, 111. The inner surface forming block 123 has a projecting surface 127 lying parallel to the inner surface 131 of the bottom 115.

The inner surface forming block 123 has a pointed tube (not shown) projecting from the center of the surface 127, the pointed tube having an air outlet hole (not shown) connected to an air cylinder of a pressure regulating device.

The inner surface forming block 123 and the peripheral wall 122 have air suction holes (not shown) opening at the surfaces 125, 127 and communicating with a vacuum pump (not shown). The air suction holes in the inner surface forming block 123 are positioned on opposite sides of the air outlet hole.

The blow molding mold A and the blow molding apparatus B operate as follows: The female and male mold members 110, 111 are installed respectively on the support plates 133, 132 with the surface 127 of the inner surface forming block 123 confronting the inner surface 128 of the bottom 115 parallel thereto in spaced-apart relationship. At this time, the upper and lower wall segments 114a, 114b are angularly displaced or open widely outwardly as shown in FIG. 11.

Then, a melted tubular parison P is supplied from the blow head E of an extrusion or injection molding machine into a position between the male and female mold members 111, 110 spaced from each other, i.e., between the fixed wall segments 114c, 114d. Thereafter, the upper and lower ends of parison P are gripped respectively by two pairs of gripper jaws (not shown) located remotely from the mold members 110, 111, while at the same time air is injected from air supply/discharge nozzles on the gripper jaws into the parison P to preliminarily expand the parison P.

The support plates 132, 133 are moved toward each other until the upper surface 127 of the inner surface forming block 123 comes in contact with the outer surface of a layer (which will be an inner wall of the molded product) of the parison P, whereupon the parison P is slightly shaped. Then, the actuator, preferably a hydraulic cylinder, of the mold clamping device is operated to move the inner surface forming block 128 toward the female mold member 110 for thereby deforming the layer of the parison P along the outer profile of the block 123.

Figure 13:
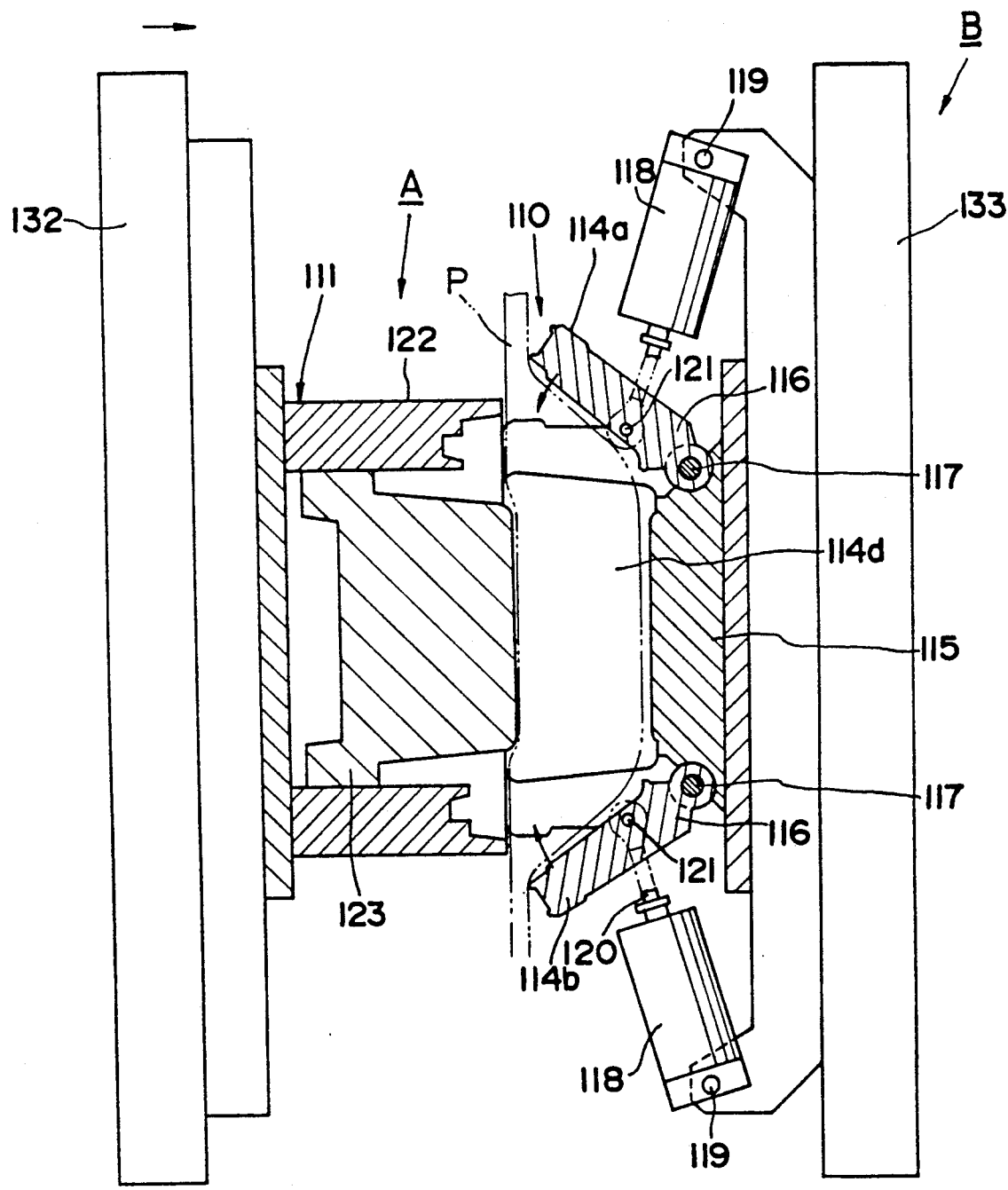
FIG. 13 through 15 are cross-sectional views showing a process for molding a product with the blow molding apparatus of FIG. 11.
Figure 14:
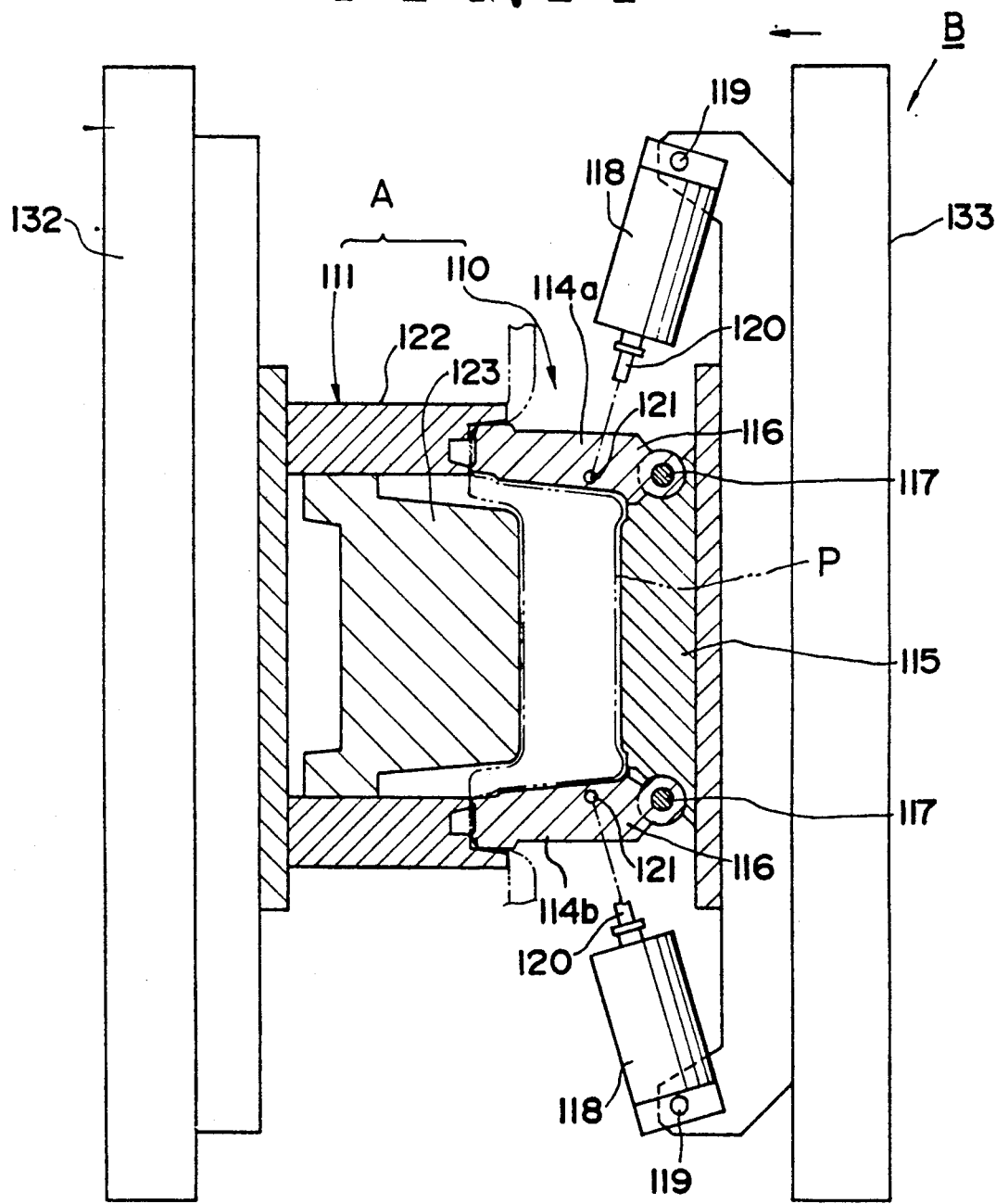

At the same time, the opposite layer (which will be an outer wall of the molded product) of the parison P which has been preliminary expanded is contained by the bottom 116 of the female mold member 110. Thereafter, the hydraulic cylinders 118 are operated to extend the piston rods 120 to angularly move the upper and lower wall segments 114a, 114b from the open position inwardly toward the closed position. As the upper and lower wall segments 114a, 114b are thus angularly moved, the opposite layer of the parison P is partly brought into contact with the inner surface of the bottom 115 and the upper and lower wall segments 114a, 114b. The mold member 110, 111 are further moved toward each other to deform the other layer of the parison P which has been held against the female mold member 110. The upper and lower wall segments 114a, 114b are displaced closely to the bottom 115 and the adjacent side wall segments 114c, 114c along the edges thereof, thus forming the female mold against which the opposite layer of the parison P is deformed without being locally extended, as shown in FIGS. 13 and 14.

Any excessive layers or portions of the parison P project from its edges and form burrs near the upper and tower corners of the molded product. In order to prevent the pressure in the parison P from rising due to the operation of the mold members, air in the parison P may be removed by the air supply/discharge nozzles.

Figure 15:
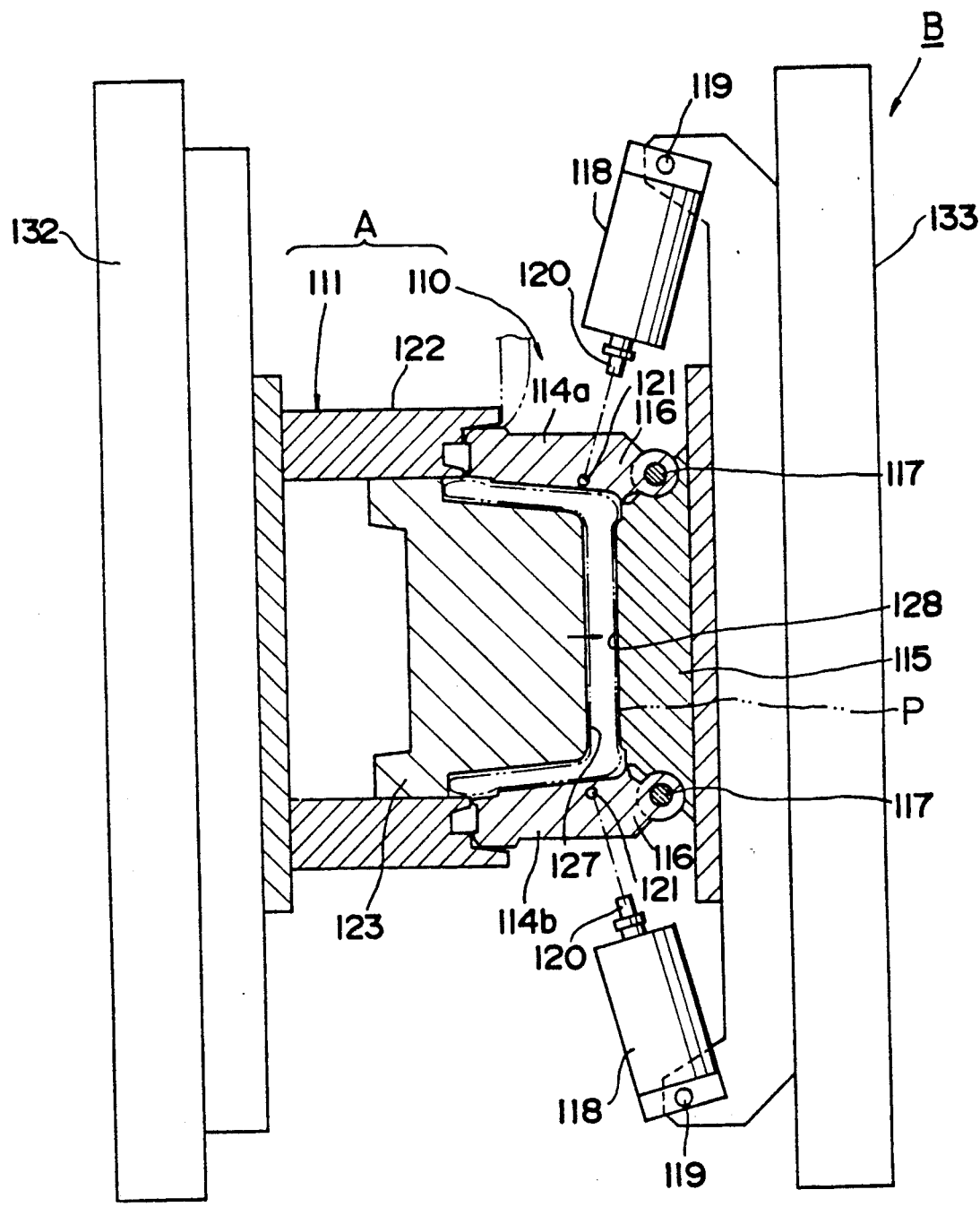
Figure 16:
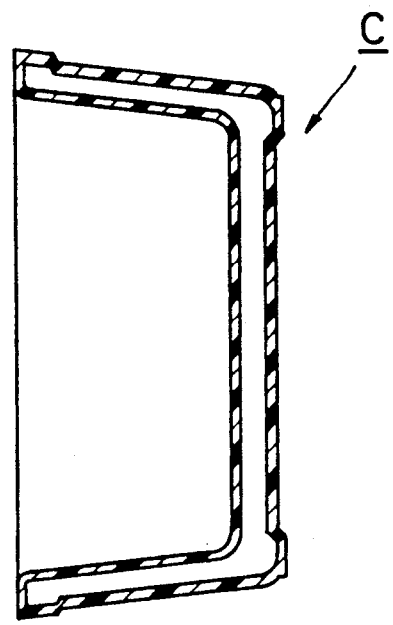
FIG. 16 is a cross-sectional view of a product molded by the blow molding apparatus of FIG. 11.

Subsequently, the support plates 132, 133 are moved slowly toward each other until the lip ends of the peripheral wall segments of the female mold member 110 engage the peripheral wall 122 of the male member 111. Therefore, the mold A is clamped to confine the parison P between the mold members 110, 111, as shown in FIG. 15. The portions of the parison P which project out of the mold A are then cut off. The center of the inner layer of the parison P thus confined between the mold members 110, 111 is pierced by the pointed tube on the male mold member 111, and air is supplied into or discharged from the parison P through the tube to regulate the air pressure in the parison P with the pressure regulating device. At the same time, the vacuum pump is operated to discharge air from a space parison P and the mold A through the air suction holes in the male mold member 111. The inner and outer layers of the parison P are thus deformed along the inner surfaces of the mold members 110, 111. The parison P is cooled and solidified by cooling water flowing through cooling water passages (not shown) defined in the mold members 110, 111, whereupon a hollow double-walled product of a desired shape is molded as shown in FIG. 16.

The molded product can be removed from the blow molding apparatus B by the process which is a reversal of the aforesaid process.

Figure 17:
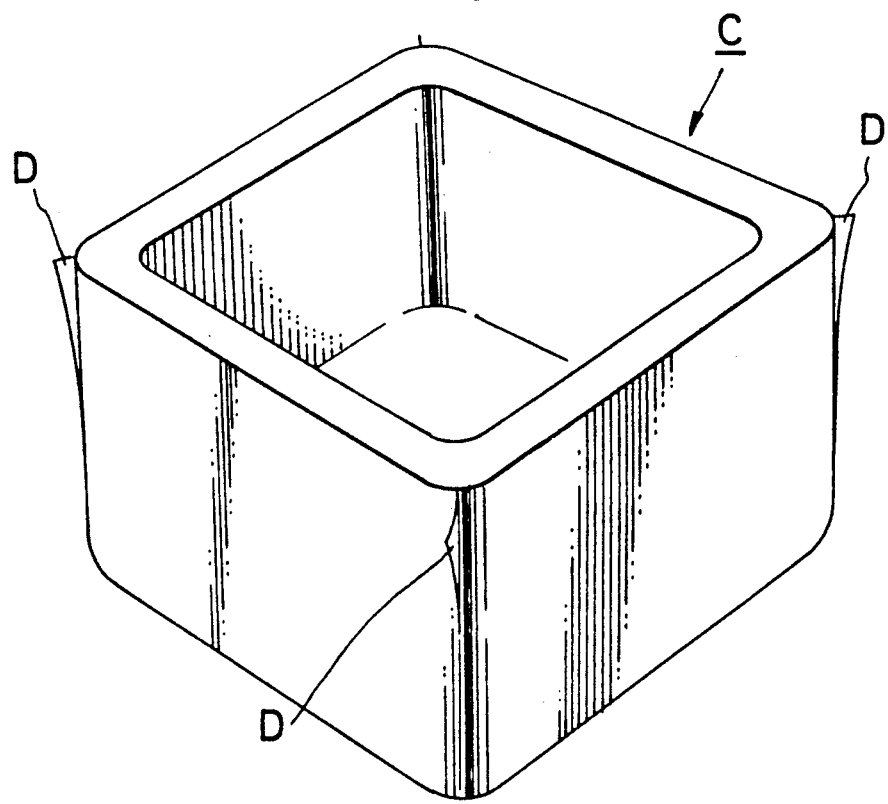
FIG. 17 is a perspective view of the molded product with burrs on its corners.

As shown in FIG. 17, burrs are formed on the upper and lower corners of the outer layer of the molded product the corners being reinforced by the burrs. In order to form such burrs, burr-forming gaps may be disposed on the mating edges of the wall segments 114a, 114b, 114c, 114d. The burrs thus formed by the burr-forming gaps will serve as reinforcing ribs on the outer corners of the formed product.

Depending on the shape of a molded product to be produced, the mold members 110, 111 of the mold A shown in FIGS. 11 through 15 may be arranged so that they are vertically movable toward and away from each other.

With the embodiment shown in FIGS. 10 through 17, the melted parison which has been injection- or extrusion- molded is supplied between and gripped by the male and female mold members, and air is injected into the gripped parison to cause the inner and outer layers of the parison to be shaped along the inner surfaces of the male and female mold members. The parison is expanded in one direction and formed into a molded double-walled product. The female mold member is of a box-shaped structure comprising peripheral wall segments and a bottom. The upper and lower peripheral wall segments spaced along the direction in which the parison is supplied are pivotally supported on the bottom outwardly of edges thereof by pivot shafts parallel to these edges, and angularly movable from a position in which they are open outwardly to a position in which they are located closely to the bottom and the other adjacent peripheral wall segments, thus forming a female mold. The other peripheral wall segments are fixed to the bottom.

After one layer (which will be an outer layer of the molded product) has been brought into contact with the inner surface of the bottom, the inner surfaces of the upper and lower peripheral wall segments which have been open outwardly are turned inwardly into contact with the layer of the parison to deform the parison in a manner to hold the parison from its upper and lower ends. When the parison is thus deformed, the layer thereof is brought into contact with the inner surfaces of the upper and lower peripheral wall segments through a successively wider area of contact upon inwardly turning movement of the upper and lower peripheral wall segments. Therefore, after the parison has contacted the female mold member, it is not locally extended, and the upper and lower walls of the molded product are smoothly shaped into a uniform thickness substantially along the inner surfaces of the female mold which is gradually assembled by the upper and lower peripheral wall segments.

Since the female mold is assembled upon contact of the edges of the upper and lower wall segments with those of the bottom and the adjacent side wall segments, the layer of the parison is gradually shaped along the inner surfaces of the female mold. Any excessive portions of the parison are gathered toward these edges, and will remain attached to the molded product as burrs at the upper and lower corners thereof. The burrs thus formed can effectively be utilized as reinforcing members for the upper and lower corners of the molded product. The product thus molded has a deep configuration.

Because the upper and lower wall segments are openable widely outwardly, when they are opened outwardly, the inner surfaces of the bottom and side wall segments can be cleaned to remove burr debris which has been cut off by the bottom and side wall segments.

If the female mold member is used in combination with the male mold member with the movable inner surface forming block, a deeper hollow double-walled product which is not thin at the corners can be molded.

The male and female mold members are horizontally movable toward and away from each other, and the female mold member includes four peripheral wall segments. Where only the upper and lower wall segments are angularly movable between the open and closed positions, the mold members can form a deep container in the shape of a rectangular parallelepiped.

In the blow molding apparatus, the male and female mold members are detachably mounted on the support plates of the mold clamping device and the upper and lower wall segments are connected to the support plates by the actuators. The blow molding apparatus of such a construction can mold a neatly shaped hollow double-walled product with their upper and lower corners reinforced with burrs.

The actuators comprise fluid-pressure or hydraulic cylinders for angularly moving the upper and lower wall segments between the open position in which they are substantially parallel to the support plates and the closed or erected position in which they are substantially perpendicular to the support plates. The upper and lower wall segments can be angularly moved easily under forces from the actuators. With the upper and lower wall segments in the open position, the melted parison supplied from the injection or extrusion molding machine can be delivered into a position between the fixed side wall segments of the female mold member.

Although certain preferred embodiments have been shown and described, it should be understood that many changes and modifications may be made therein without departing from the scope of the appended claims.

We claim:

1. A blow molding mold for a hollow double-walled product, comprising a pair of male and female mold members for holding a parison therebetween and air supply means for injecting air under pressure into the parison, said male and female mold members being movable toward and away from each other and having respective outer and inner surfaces for shaping inner and outer layers of the parison therealong under the pressure of air injected into the parison by said air supply means, said female mold member being of a box-shaped structure which includes first and second pairs of confronting peripheral wall segments and a single bottom, said peripheral wall segments of each said pair being pivotally supported on said bottom by pivot shafts disposed outwardly of and extending parallel to edges of said bottom, said peripheral wall segments of each said pair being angularly movable between an open position in which said peripheral wall segments of each said pair are open outwardly and a closed position in which said peripheral wall segments of each said pair engage said bottom and adjacent ones of said peripheral wall segments to form a female mold cavity, said peripheral wall segments of said first pair each having parison corner expansion prevention walls joined to opposite sides thereof and extending a predetermined dimension approximately in a supply direction in which the parison is supplied between the male and female mold members, said parison corner expansion prevention walls projecting outwardly beyond said peripheral wall segments of said second pair when said peripheral wall segments of said first and second pairs are in said closed positions.

2. A blow molding mold according to claim 1, wherein said first pair of peripheral wall segments extends approximately parallel to said supply direction in which the parison is supplied.

3. A blow molding mold according to claim 1, wherein said second pair of peripheral wall segments extends approximately perpendicular to said supply direction in which the parison is supplied.

4. A blow molding mold according to claim 1, wherein said outer surface of said male mold member is spaced a predetermined distance from said peripheral wall segments of each said pair and a predetermined distance from said bottom when said peripheral wall segments of each said pair are in said closed position and when said male and female mold members are positioned closely to each other.

5. A blow molding mold according to claim 4, wherein said predetermined distance corresponds to a thickness of a wall of the hollow double-walled product.

6. A blow molding mold according to claim 1, including hydraulic cylinders, each cylinder operatively connected between a respective one of said peripheral wall segments and said bottom, said peripheral wall segments of each said pair being angularly movable between said open and closed positions by said hydraulic cylinders.

7. A blow molding mold according to claim 1, wherein each of said parison corner expansion prevention walls has an inner surface lying substantially flush with an inner surface of and is joined to a respective one of said peripheral wall segments.

8. A blow molding mold according to claim 1, wherein each of said parison corner expansion prevention walls has an outwardly concave surface having an inner edge portion lying substantially flush with an inner surface of and is joined to a respective one of said peripheral wall segments.

9. A blow molding mold according to claim 1, wherein each of said parison corner expansion prevention walls has a plurality of outlet holes, and including means for injecting warm air into said female mold member through said outlet holes.

10. A blow molding mold for a hollow double-walled product, comprising a blow head for supplying a tubular parison, a pair of support plates movable toward and away from each other, a pair of male and female mold members for holding the parison therebetween, and air supply means for injecting air under pressure into the parison, said male and female mold members being detachably mounted respectively on said support plates and having respective outer and inner surfaces for shaping inner and outer layers of the parison therealong under the pressure of air injected into the parison by said air supply means, said female mold member being of a box-shaped structure which includes first and second pairs of confronting peripheral wall segments and a single bottom, said peripheral wall segments of each said pair being angularly movable between an open position in which said peripheral wall segments of each said pair are open outwardly and a closed position in which said peripheral wall segments of each said pair engage said bottom and adjacent ones of said peripheral wall segments to form a female mold cavity, said peripheral wall segments of said first pair each having parison corner expansion prevention walls joined to opposite sides thereof and extending a predetermined dimension approximately in a supply direction in which the parison is supplied between the male and female mold members, said parison corner expansion prevention walls projecting outwardly beyond said peripheral wall segments of said second pair when said peripheral wall segments of said first and second pairs are in said closed positions.

11. A blow molding mold according to claim 10, further including actuators for angularly moving said peripheral wall segments of each said pair, said actuators each being operatively connected between said support plate on which said female mold member is mounted and a respective one of said peripheral wall segments.

12. A blow molding mold according to claim 11, wherein each of said actuators includes a hydraulic cylinder.

13. A blow molding mold for a hollow double-walled product, comprising a pair of male and female mold members for holding a parison therebetween and air supply means for injecting air under pressure into the parison, said male and female mold members being movable toward and away from each other and having respective outer and inner surfaces for shaping inner and outer layers of the parison therealong under the pressure of air injected into the parison by said air supply means, said female mold member being of a box-shaped structure which includes first and second pairs of confronting peripheral wall segments and a single bottom, said peripheral wall segments of each said pair being pivotally supported on said bottom by pivot shafts disposed outwardly of and extending parallel to edges of said bottom, said peripheral wall segments of each pair being angularly movable between an open position in which said peripheral wall segments of each said pair are open outwardly and a closed position in which said peripheral wall segments of each said pair engage said bottom and adjacent ones of said peripheral wall segments to form a female mold cavity, said peripheral wall segments of said first pair each having parison corner expansion prevention walls joined to opposite sides thereof and extending a predetermined dimension approximately in a supply direction in which the parison is supplied between the male and female mold members, said parison corner expansion prevention walls being positioned closely to said peripheral wall segments of said second pair when said peripheral wall segments of said first and second pairs are in said open positions.

* * * * *